(12) United States Patent
Maas

(10) Patent No.: US 9,516,800 B2
(45) Date of Patent: Dec. 13, 2016

(54) AERATION APPARATUS AND METHODS

(71) Applicant: PlanetAir Turf Products, LLC, Owatonna, MN (US)

(72) Inventor: David R. Maas, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 99 days.

(21) Appl. No.: 14/610,125

(22) Filed: Jan. 30, 2015

(65) Prior Publication Data

US 2016/0219780 A1 Aug. 4, 2016

(51) Int. Cl.
*A01B 45/02* (2006.01)
*A01B 37/00* (2006.01)

(52) U.S. Cl.
CPC ........... *A01B 45/023* (2013.01); *A01B 45/026* (2013.01); *A01B 37/00* (2013.01)

(58) Field of Classification Search
CPC ....... A01B 45/00; A01B 45/02; A01B 45/026; A01B 37/00
USPC .................................................... 172/21, 22
See application file for complete search history.

(56) References Cited

U.S. PATENT DOCUMENTS

| | | |
|---|---|---|
| 502,301 A | 8/1893 | Kime |
| 1,362,409 A | 12/1920 | Forker |
| 1,704,986 A | 3/1929 | Marcy |
| 1,955,937 A | 4/1934 | Allen |
| 1,965,510 A | 7/1934 | Porter |
| 2,041,208 A | 5/1936 | Rienks |
| 2,111,478 A | 3/1938 | McGuire |
| 2,302,944 A | 11/1942 | Helbig |
| 2,347,748 A | 5/1944 | Melling |
| 2,591,572 A | 4/1952 | Mascaro |
| 2,700,926 A | 2/1955 | Goit |
| 2,778,291 A | 1/1957 | Kerns |
| 3,022,833 A * | 2/1962 | Reaser ................... A01B 45/02 172/19 |
| 3,143,090 A | 8/1964 | Cecil et al. |
| 3,148,737 A | 9/1964 | Lunsford |
| 3,393,751 A | 7/1968 | Mascaro |
| 3,522,965 A | 8/1970 | Indzeoski |
| 3,534,818 A | 10/1970 | Mascaro |
| 3,586,109 A | 6/1971 | Eversole et al. |
| 3,650,331 A | 3/1972 | Dedoes |
| 3,707,132 A | 12/1972 | Hansen |
| 3,797,577 A | 3/1974 | Killion et al. |
| 3,877,401 A | 4/1975 | Gutman |

(Continued)

FOREIGN PATENT DOCUMENTS

| | | |
|---|---|---|
| EP | 0 024 696 | 3/1981 |
| WO | WO 2007/076450 | 7/2007 |

OTHER PUBLICATIONS

International Search Report and Written Opinion in International Application No. PCT/US2016/015268, dated May 4, 2016, 10 pages.

(Continued)

*Primary Examiner* — Jamie L McGowan
(74) *Attorney, Agent, or Firm* — Fish & Richardson P.C.

(57) ABSTRACT

A soil aeration apparatus can include an aeration rotor comprising at least one set of aeration tines configured for movement in a planetary motion about an axis. The apparatus can further include the aeration rotor being configured to remove soil plugs from a ground surface and break the soil plugs into soil particles when the aeration rotor is rotated.

28 Claims, 13 Drawing Sheets

(56) References Cited

U.S. PATENT DOCUMENTS

| | | | |
|---|---|---|---|
| 3,881,553 A * | 5/1975 | Angeski | A01B 1/243 172/22 |
| 3,939,917 A | 2/1976 | Reed, Jr. et al. | |
| 3,993,143 A | 11/1976 | Moreland, Jr. | |
| 4,020,907 A | 5/1977 | Luck | |
| 4,081,034 A * | 3/1978 | Hines | A01B 45/02 172/22 |
| 4,084,642 A | 4/1978 | Killion | |
| 4,148,362 A | 4/1979 | Orth | |
| 4,154,305 A | 5/1979 | Prewett | |
| 4,158,391 A | 6/1979 | Clements | |
| 4,192,387 A | 3/1980 | Stinson | |
| 4,212,357 A | 7/1980 | Clements et al. | |
| RE30,705 E | 8/1981 | Hines | |
| 4,326,591 A | 4/1982 | Dedoes | |
| 4,336,760 A | 6/1982 | Cohen et al. | |
| 4,383,580 A | 5/1983 | Huxford | |
| 4,489,787 A | 12/1984 | Gary | |
| 4,538,689 A | 9/1985 | Dietrich, Sr. | |
| 4,550,783 A | 11/1985 | Hansen | |
| 4,619,329 A | 10/1986 | Gorbett | |
| 4,632,189 A | 12/1986 | Rizzo | |
| 4,662,456 A | 5/1987 | Classen | |
| 4,699,220 A | 10/1987 | Strohm | |
| 4,723,607 A | 2/1988 | Hansen | |
| 4,773,486 A | 9/1988 | Huber et al. | |
| 4,776,404 A | 10/1988 | Rogers et al. | |
| 4,791,995 A | 12/1988 | Hochlan, Jr. | |
| 4,840,232 A | 6/1989 | Mayer | |
| 4,867,244 A | 9/1989 | Cozine et al. | |
| 4,881,602 A | 11/1989 | Hansen et al. | |
| 4,889,190 A * | 12/1989 | Barlage | A01B 33/065 172/103 |
| 4,899,828 A | 2/1990 | Harris | |
| 4,910,948 A | 3/1990 | Nelson | |
| 4,924,944 A | 5/1990 | Cozine et al. | |
| 5,014,791 A | 5/1991 | Kure | |
| 5,020,602 A | 6/1991 | Dellinger | |
| 5,029,652 A | 7/1991 | Whitfield | |
| 5,036,651 A | 8/1991 | Nelson | |
| 5,036,655 A | 8/1991 | Holloway | |
| 5,069,293 A | 12/1991 | St. Romain | |
| 5,101,910 A | 4/1992 | Dawson | |
| 5,119,880 A | 6/1992 | Zehrung, Jr. et al. | |
| 5,142,852 A | 9/1992 | Nelson | |
| 5,152,348 A | 10/1992 | Flanagan, Sr. et al. | |
| 5,172,768 A | 12/1992 | Straus | |
| 5,183,120 A | 2/1993 | Watanabe | |
| 5,207,278 A | 5/1993 | Hatlen | |
| 5,209,306 A | 5/1993 | Whitfield | |
| 5,398,767 A | 3/1995 | Warke | |
| 5,398,768 A | 3/1995 | Staples | |
| 5,460,229 A | 10/1995 | Mattis | |
| 5,469,922 A | 11/1995 | Bjorge | |
| 5,495,895 A | 3/1996 | Sakamoto | |
| 5,524,425 A | 6/1996 | Gallazzini | |
| 5,570,746 A | 11/1996 | Jones et al. | |
| 5,579,847 A | 12/1996 | Postema | |
| 5,586,603 A | 12/1996 | Mattis | |
| 5,586,604 A | 12/1996 | Postema | |
| 5,615,744 A | 4/1997 | Krafka | |
| 5,623,996 A | 4/1997 | Postema | |
| 5,662,172 A | 9/1997 | Brown | |
| 5,673,756 A | 10/1997 | Classen | |
| 5,680,903 A | 10/1997 | Oliver | |
| 5,690,179 A | 11/1997 | Dickson | |
| 5,709,272 A | 1/1998 | Jones et al. | |
| 5,709,273 A | 1/1998 | Roth | |
| 5,765,645 A | 6/1998 | Postema | |
| 5,769,169 A | 6/1998 | Miksitz | |
| 5,803,181 A | 9/1998 | Hsu | |
| 5,806,293 A | 9/1998 | Klein et al. | |
| 5,816,336 A | 10/1998 | Underhill | |
| 5,823,269 A | 10/1998 | Leclerc | |
| 5,868,206 A | 2/1999 | Miller | |
| 5,906,090 A | 5/1999 | Knudsen | |
| 5,934,055 A | 8/1999 | Steele | |
| 5,937,953 A | 8/1999 | Melberg et al. | |
| 6,003,612 A | 12/1999 | Knight et al. | |
| 6,003,613 A | 12/1999 | Reincke | |
| 6,038,989 A | 3/2000 | Comer et al. | |
| 6,041,869 A | 3/2000 | Lewis et al. | |
| 6,086,520 A | 7/2000 | Rodriquez | |
| 6,102,129 A | 8/2000 | Classen | |
| 6,179,061 B1 | 1/2001 | Fiore | |
| 6,241,025 B1 | 6/2001 | Myers et al. | |
| 6,273,197 B1 | 8/2001 | Marlow | |
| 6,321,849 B1 | 11/2001 | Underhill | |
| 6,415,872 B2 | 7/2002 | Myers et al. | |
| 6,425,161 B1 | 7/2002 | LeMeur, Jr. et al. | |
| 6,484,811 B1 | 11/2002 | Edwards | |
| 6,488,100 B2 * | 12/2002 | Underhill | A01B 45/02 172/22 |
| 6,513,603 B2 | 2/2003 | Bjorge | |
| 6,543,798 B2 | 4/2003 | Schaffner et al. | |
| 6,659,190 B2 | 12/2003 | Jessen | |
| 6,675,905 B2 | 1/2004 | Hill et al. | |
| 6,684,960 B1 | 2/2004 | Ng et al. | |
| 6,691,791 B2 | 2/2004 | Bjorge | |
| 6,708,773 B1 | 3/2004 | Kinkead et al. | |
| 6,758,283 B2 | 7/2004 | Lauer et al. | |
| 6,792,704 B2 | 9/2004 | Johnson | |
| 6,805,205 B1 | 10/2004 | Gabard | |
| 6,983,806 B2 | 1/2006 | Bjorge | |
| 7,055,617 B2 | 6/2006 | Bjorge et al. | |
| 7,070,005 B2 | 7/2006 | Maas | |
| 7,096,968 B2 | 8/2006 | Maas | |
| 7,152,691 B2 | 12/2006 | Maas et al. | |
| 7,204,317 B2 | 4/2007 | Maas et al. | |
| 7,290,619 B2 | 11/2007 | Maas et al. | |
| 7,451,831 B2 | 11/2008 | Bjorge et al. | |
| 7,575,064 B2 * | 8/2009 | Maas | A01B 45/02 172/123 |
| 2003/0015125 A1 | 1/2003 | Steadman | |
| 2003/0230417 A1 | 12/2003 | Maas | |
| 2005/0147470 A1 | 7/2005 | Fimbinger | |
| 2006/0037762 A1 | 2/2006 | Maas | |
| 2006/0225899 A1 | 10/2006 | Maas et al. | |
| 2008/0041600 A1 | 2/2008 | Maas et al. | |
| 2008/0053350 A1 | 3/2008 | Jones et al. | |
| 2013/0202366 A1 | 8/2013 | Maas | |

OTHER PUBLICATIONS

PlanetAir Aerator, "Aerate, Mow, then Putt in just 15 minutes . . .", Brochure, PlanetAir Turf Products, LLC—believed to have been publicly available before Aug. 11, 2003.

PlanetAir Aerator, "Aerate. Mow. Play.: Breaking New Ground in Turf Maintenance Technology," Brochure, PlanetAir Turf Products, LLC—believed to have been publicly available before Aug. 11, 2003, 8 pages.

PlanetAir Aerator, "Innovation that improves and protects your piece of the planet . . . ," Brochure, PlanetAir Turf Products, LLC—believed to have been publicly available before Aug. 11, 2003.

* cited by examiner

AERATION APPARATUS AND METHODS

TECHNICAL FIELD

This document relates to treating a ground surface, such as a system for aerating a ground surface.

BACKGROUND

Soil aeration is a conventional technique used by groundskeepers to reduce compaction in the ground soil, stimulate plant growth, and promote proper drainage. Soil may become compacted from overuse or environmental effects, which ultimately affects the soil permeability and development of rooted plants within the soil. In particular, compacted soil restricts the amount of oxygen that can enter the soil and the amount of carbon dioxide that can escape. Not all soils are affected equally by overuse and environmental factors. The amount of compaction depends on soil composition, the amount of vegetation, and the moisture content of the soil. Periodic soil aeration relieves the compaction in the soil before the negative effects overburden the soil to the point that it can no longer support desirable vegetation.

Some conventional soil aeration systems penetrate the ground using coring tubes that penetrate the ground and remove "plugs" of soil. When the plugs of soil are removed from the ground, the treated ground surface is littered with the soil plugs. In other aeration systems, a soil aeration apparatus may include a set of aeration blades that cut the soil so as to form the aeration pockets. In these cases, there are no plugs of soil that are removed from the ground and littered across the ground surface. Soil aeration systems can be relatively complex, bulky, heavy, and consequently expensive and complex to manufacture and operate.

SUMMARY

Some embodiments of a soil aeration apparatus can include one or more of the features and functions disclosed herein. Some embodiments of a soil aeration apparatus can be sized and configured to be relatively small and light weight. Some embodiments of a soil aeration apparatus can be configured to for use as a walk-behind or push soil aeration apparatus. Some embodiments of a soil aeration apparatus can be configured to pull soil plugs from a ground surface and break the soil plugs into soil particles to be returned to the ground surface.

In one aspect, a soil aeration apparatus can include an aeration rotor with a carrier and a plurality of aeration tines supported by the carrier. The rotor is configured to drive the aeration tines to penetrate soil and remove soil plugs from the soil when the aeration rotor is rotated. The apparatus may further include a shield defining a rotor cavity and at least partially surrounding the aeration rotor positioned in the rotor cavity. The shield defines at least one tine port sized and positioned to allow for ingress and egress of the aeration tines during rotation of the rotor. The shield defines a plurality of sifting ports sized small enough to retain soil plugs within the rotor cavity (e.g., until the plugs are broken) and large enough to allow soil particles from broken soil plugs to pass through the sifting ports out of the rotor cavity.

In one aspect, a soil aeration apparatus includes a frame connected to at least two wheels for travelling over a ground surface, the frame having a handle positioned and configured to facilitate a user to push the soil aeration apparatus. The apparatus further includes an aeration rotor operably supported by the frame. The aeration rotor includes first and second carriers rotatable with respect to the frame about a first axis. The aeration rotor includes a first tine-holder shaft extending between the first and second carriers, the first tine-holder shaft supporting a first set of aeration tines. The first tine-holder shaft is rotatable with respect to the first carrier about a second axis. The aeration rotor includes a second tine-holder shaft extending between the first and second carriers, the second tine-holder shaft supporting a second set of aeration tines. The second tine-holder shaft is rotatable with respect to the first carrier about a third axis. The apparatus further includes a motor supported by the frame and operably connected to the aeration rotor to drive rotation of the aeration rotor such that the aeration tines can penetrate and exit the ground when the aeration rotor is rotated.

In one aspect, a soil aeration apparatus includes an aeration rotor comprising at least one set of aeration tines configured for movement in a planetary motion about an axis. The apparatus further includes a motor operably connected to the aeration rotor to drive rotation of the aeration rotor such that the aeration tines can penetrate and exit a ground surface when the aeration rotor is rotated. The apparatus further includes a frame supporting the aeration rotor and the motor and having a handle configured to be held by a user walking behind the soil aeration apparatus.

In one aspect, a soil aeration apparatus includes an aeration rotor comprising at least one set of aeration tines configured for movement in a planetary motion about an axis. The apparatus further includes the aeration rotor being configured to remove soil plugs from a ground surface and break the soil plugs into soil particles when the aeration rotor is rotated.

Implementations of the above-described apparatuses can include any, all, or none of the following features. The aeration rotor includes first and second carriers rotatable about a first axis. The aeration rotor includes a first tine-holder shaft extending between the first and second carriers, the first tine-holder shaft supporting a first set of aeration tines, wherein the first tine-holder shaft is rotatable with respect to the first carrier about a second axis. The aeration rotor includes a second tine-holder shaft extending between the first and second carriers, the second tine-holder shaft supporting a second set of aeration tines, wherein the second tine-holder shaft is rotatable with respect to the first carrier about a third axis. Rotation of the first and second tine-holder shafts turns the first and second sets of aeration tines to sweep through the first axis. The aeration rotor rotates in a first direction and the first and second tine-holder shafts rotate in a second direction during rotation of the aeration rotor in the first direction. The aeration rotor has a radius extending from the first axis to each of the second and third axes of about 3.5 inches. The aeration rotor has a radius extending from the first axis to each of the second and third axes of between about 3 inches to about 4 inches. The aeration rotor has a radius extending from the first axis to each of the second and third axes of between about 2 inches to about 6 inches. At least some of the plurality of aeration tines have a length exceeding the radius. The shield defines a second tine port sized and positioned to allow for ingress and egress of the aeration tines during rotation of the rotor, wherein the aeration tines extend out of the shield only at the first and second tine ports during rotation of the rotor. The shield includes a front shield positioned forward of the aeration rotor and a rear shield positioned behind the aeration rotor, wherein each of the front and rear shields define a plurality of the sifting ports sized small enough to contain soil plugs within the rotor cavity and large enough to allow soil particles from broken soil plugs to pass through the sifting ports out of the rotor cavity. The aeration rotor includes a pulverizing bar configured for pulverizing soil plugs into soil particles in the rotor cavity. The pulverizing bar is positioned between about 0.05 inch and about 0.2 inch from an inner surface of the shield. Each of the aeration tines includes a knife and a tube connected to the knife, wherein the aeration rotor and aeration tines are configured to pull soil plugs from a ground surface and fling the soil plugs into the rotor cavity to be pulverized into soil particles by the aeration rotor within the rotor cavity. The soil aeration apparatus includes a motor operably connected to the aeration rotor to drive rotation of the aeration rotor and a relief spring system connected between the motor and the aeration rotor and configured to allow for some rotation by the motor when rotation of the aeration tines is temporarily slowed or stopped. Spring capacity of the relief spring system is equal to or greater than weight of the soil aeration apparatus. The spring capacity of the relief spring system is between about 150 pounds and about 600 pounds and the soil aeration apparatus weighs between about 100 pounds and about 500 pounds. The soil aeration apparatus includes a frame connected to at least two wheels for travelling over a ground surface, the frame supporting the rotor and having a handle positioned and configured to facilitate a user to push the soil aeration apparatus.

In one aspect, a method of operating a soil aeration apparatus includes moving a set of aeration tines in a planetary motion such that the aeration tines revolve about a first axis and rotate about a second axis different than the first axis. The method further includes removing soil plugs from a ground surface via the aeration tines. The method further includes breaking the soil plugs into soil particles via components of the soil aeration apparatus. The method further includes returning the soil particles to the ground surface.

Implementations can include any, all, or none of the following features. The method including flinging the soil plugs from the aeration tines into a rotor cavity, wherein the soil plugs are broken into soil particles in the rotor cavity. The method including passing the soil particles through sifting ports sized small enough to restrict passage of the soil plugs and large enough to allow passage of the soil particles from broken soil plugs. The method including walking behind the soil aeration apparatus and holding a handle of the soil aeration apparatus while operating the soil aeration apparatus to remove and break soil plugs.

Some or all of the embodiments described herein may provide one or more of the following advantages. First, some embodiments of the aeration apparatus provide a planetary aeration path for each tine so as to remove a small plug of soil, yet the aeration apparatus can be configured to reduce the likelihood of the soil plugs littering the ground after the plugs are removed. Rather, the rotor cavity of the aeration apparatus can break apart the some or all of the soil plugs before the soil is returned to the ground surface (for example, via the sifting ports of the shield).

Second, some embodiments of the aeration apparatus may be configured to provide a light-weight, convenient aerator in which a user can simply walk behind the aeration apparatus during operation. For example, the aeration apparatus may be relatively light (as compared to some traditional aerators having planetary aeration apparatus), such as weighing 180 lbs. or less in total (and, optionally, the rotor device weighing less than 50 lbs.). Additionally, the aeration apparatus may be provided in a set of sizes (e.g., a width of about 20 inches to about 50 inches, and preferably a width selected from the group consisting of about 21 inches, about 29, inches, about 37 inches, and about 45 inches), so that a user walking behind the apparatus can readily transport and turn the apparatus during operation. Reducing size and weight of the aeration apparatus can also reduce the amount of horsepower and fuel consumption required for operation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
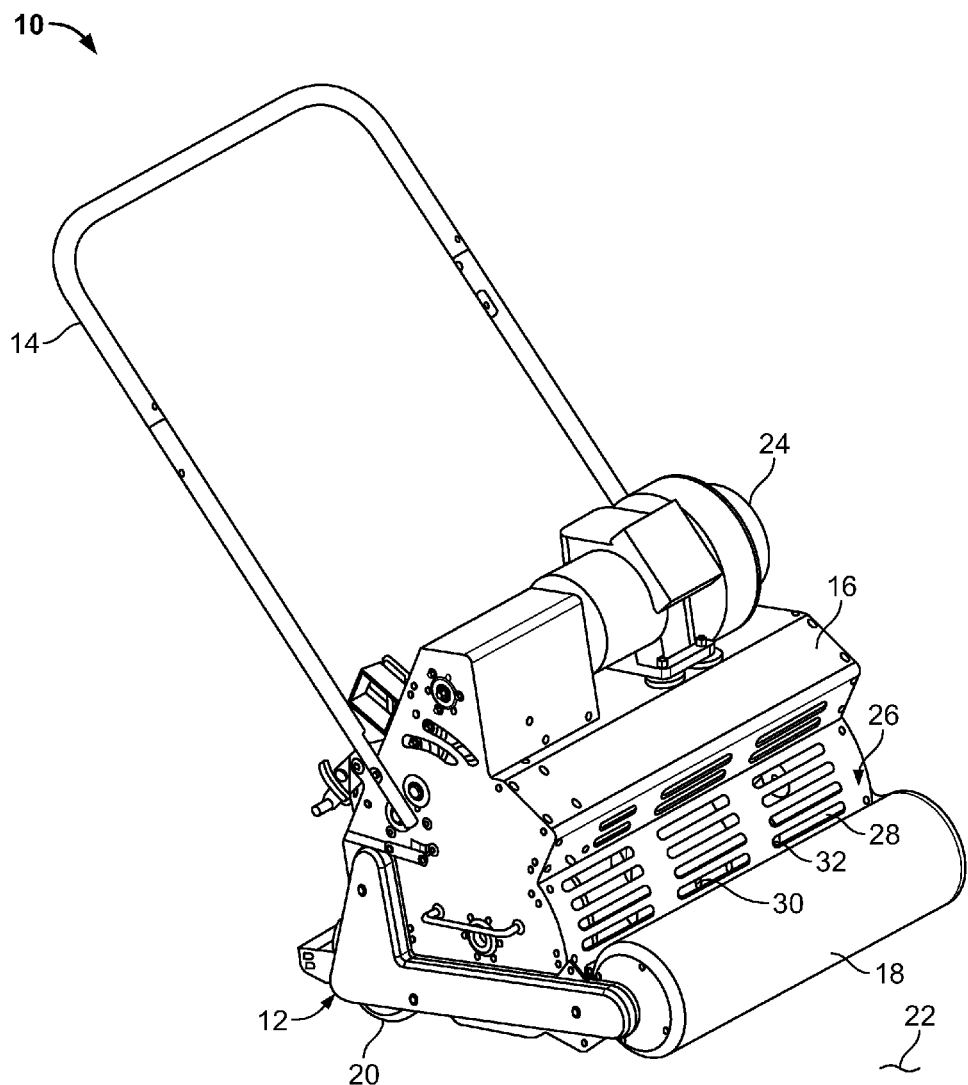
FIG. 1 is a perspective top view of a soil aeration apparatus in accordance with an embodiment of the invention.

Referring to FIG. 1, some embodiments of a soil aeration apparatus 10 include a frame 12 which includes a handle 14 and a housing 16. The frame 12 is connected to a pair of wheels 18 and 20, which are configured for traveling over a ground surface 22 to facilitate movement of the soil aeration apparatus 10. The housing 16 surrounds and at least partially encloses components of the soil aeration apparatus 10. In the illustrated embodiment, the housing 16 is part of the frame 12, providing structural support for the soil aeration apparatus 10. A motor 24 is mounted to and supported by the housing 16. The handle 14 is mounted to and supported by the housing 16. In other embodiments, the housing 16 need not be part of the frame 12, but rather can be a non-structural enclosure supported by the frame 12.

In the illustrated embodiment, the wheel 18 is a front wheel and the wheel 20 is a rear wheel. The handle 14 can be mounted in a position and configured to facilitate a user to walk behind and push the soil aeration apparatus 10. For example, in the illustrated embodiment the handle 14 is a substantially U-shaped handle with ends mounted to left and right sides of the housing 16 so as to extend rearward behind the soil aeration apparatus 10.

In some embodiments, the motor 24 can be operably connected to one or more of the wheels 18 and 20 so as to drive movement of the soil aeration apparatus 10 with or without force provided by the user. The soil aeration apparatus 10 can be operated as a push or walk-behind system without requiring a vehicle to tow or otherwise propel the soil aeration apparatus 10. In other embodiments, the soil aeration apparatus 10 can be modified for use with a towing vehicle.

The soil aeration apparatus 10 includes a shield 26 defining a rotor cavity 28 and at least partially surrounding an aeration rotor 30 in the rotor cavity 28. The shield 26 defines sifting ports 32 extending through the shield 26 to create a passage from the rotor cavity 28 to an exterior of the shield 26. Visibility of the rotor cavity 28 and the aeration rotor 30 are obscured as seen in FIG. 1 but can be partially seen through the sifting ports 32.

The sifting ports 32 can be sized small enough to contain soil plugs (not shown in FIG. 1) within the rotor cavity 28 and large enough to allow soil particles (not shown in FIG. 1) from broken soil plugs to pass through the sifting ports 32 and out of the rotor cavity 28. In some embodiments the shield 26 can be formed of sheet metal. In some embodiments, the shield 26 can be formed of a mesh or screen.

The shield 26 can be formed of aluminum, carbon steel, or an alloy thereof. In the illustrated embodiment, the shield 26 is formed of a curved sheet of aluminum metal having three rows of laterally-elongated sifting ports 32. In other embodiments, the shield 26 can be formed of a wire mesh of metal (e.g. steel) that defines the sifting ports 32 between wires. In some embodiments, all or most of the frame 12 (including the housing 16 and shield 26) can be formed of aluminum or an aluminum alloy so as to reduce overall weight of the soil aeration apparatus 10. In such embodiments, the aeration rotor 30 can be made of a material that is heavier and stronger than aluminum, such as carbon steel, so that the soil aeration apparatus 10 can be both relatively light-weight and durable as suitable for its application.

Figure 2:
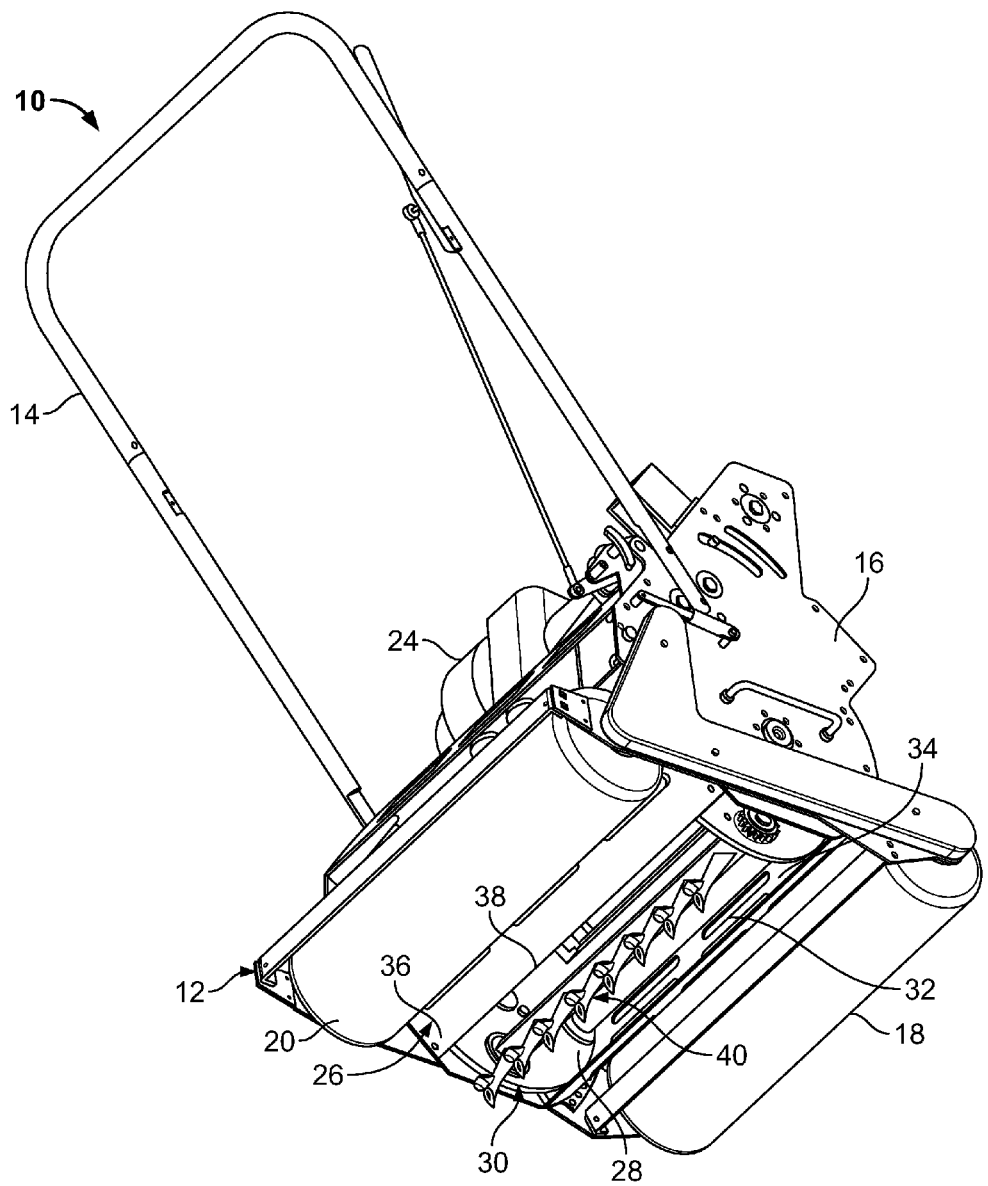
FIG. 2 is a perspective bottom view of the soil aeration apparatus of FIG. 1.

Referring to FIG. 2, the shield 26 can be a shield system that includes a front shield 34 and a rear shield 36 that combine to define the rotor cavity 28. The shield 26 defines a bottom tine port 38 between edges of the front shield 34 and the rear shield 36. The bottom tine port 38 is an elongated opening between the front shield 34 and the rear shield 36 that extends substantially a full length of the aeration rotor 30. The bottom tine port 38 is sized and positioned to allow for ingress and egress of a plurality of aeration tines 40 that are attached to and part of the aeration rotor 30. The bottom tine port 38 is positioned at a bottom of the soil aeration apparatus 10 to allow the aeration tines 40 to extend out of the rotor cavity 28 to penetrate soil and remove soil plugs from the soil when the aeration rotor 30 is rotated.

Figure 3:
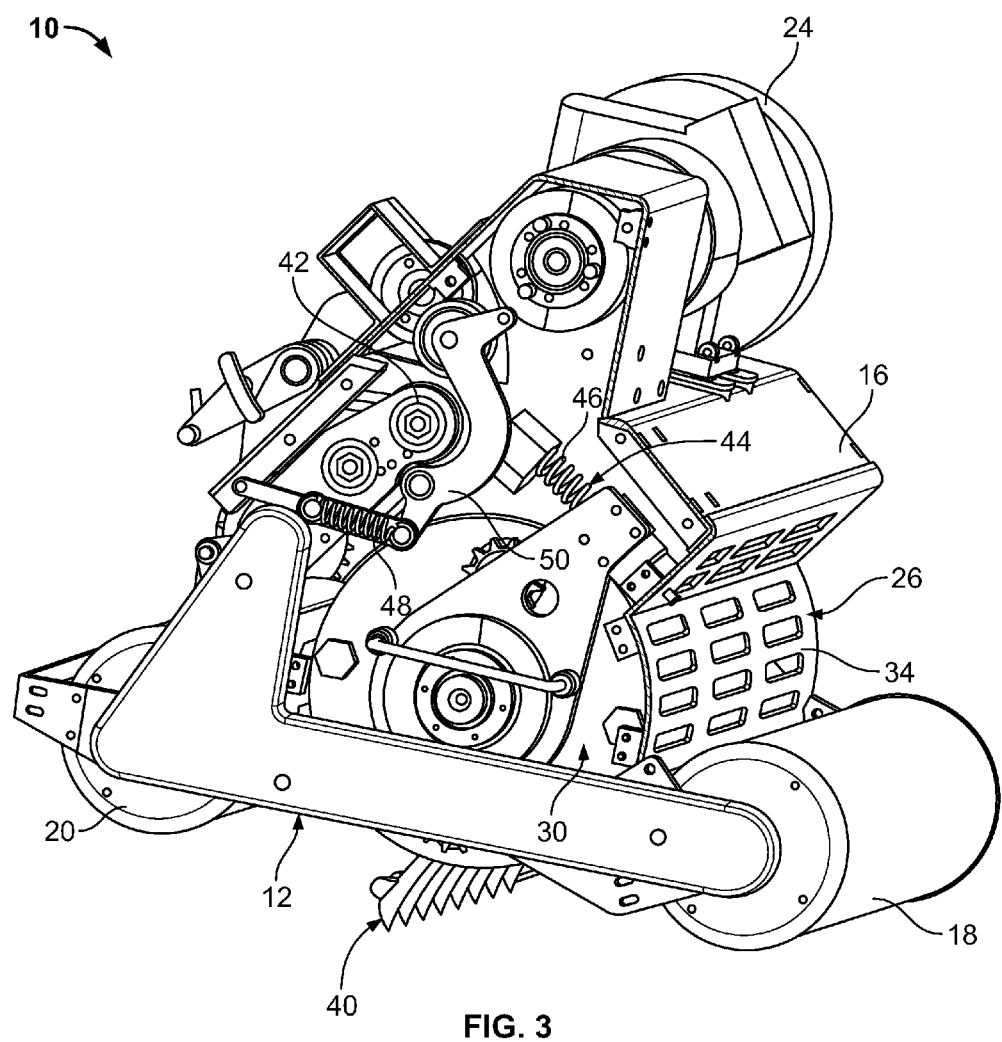
FIG. 3 is a perspective view of the soil aeration apparatus of FIG. 1 with portions of a housing removed.

Referring to FIG. 3, in this embodiment, the motor 24 is connected to a gear system 42 that can drive one or more of the wheel 18, the wheel 20, and the aeration rotor 30. In the illustrated embodiment, the gear system 42 includes a series of gears connecting the motor 24 to each of the wheel 18, the wheel 20, and the aeration rotor 30 to transmit force and motion from the motor 24 to the wheel 18, the wheel 20, and the aeration rotor 30. In some embodiments, the gear system 42 can include belts and/or chains (not shown) in addition to or instead of gears.

In some embodiments, the soil aeration apparatus 10 can have a relief spring system 44 connected to the gear system 42. The relief spring system 44 can include one or more springs 46 and 48 connected to a linkage 50 allowing for relief when the aeration tines 40 are temporarily slowed or stopped, such as one or more of the aeration tines 40 of the aeration rotor 30 hitting a rock. The relief spring system 44 can be connected between the motor 24 and the aeration tines 40 to allow for some rotation by the motor 24 even when rotation of the aeration tines 40 is temporarily slowed or stopped. Rotation of the aeration tines 40 can be slowed in response to hitting a rock, the relief spring system 44 can be compressed, and the aeration tines 40 can then rebound and continue operation. This can reduce jerking and damage caused to components of the soil aeration apparatus 10, such as gears or chains of the gear system 42. Because the relief spring system 44 can reduce jerking, forces, and damage caused to components of the soil aeration apparatus 10, such components can be made smaller and lighter weight. Horsepower required for operation can be reduced, allowing for the motor 24 to also be smaller, lighter weight, and more fuel efficient. Thus, in some embodiments, use of the relief spring system 44 can reduce overall weight and fuel consumption of the soil aeration apparatus 10.

In some embodiments, spring capacity of the relief spring system 44 can be equal to or greater than the weight of the soil aeration apparatus 10. This can allow the relief spring system 44 to effectively provide relief for all or nearly all possible force conditions. For example, if one or more of the aeration tines 40 of the aeration rotor 30 hits a rock causing a force that is less than the capacity of the relief spring system 44, then the relief spring system 44 can absorb that force. If, however, one or more of the aeration tines 40 of the aeration rotor 30 hits a rock causing a force that is greater than the capacity of the relief spring system 44, that force will also be greater than the weight of the soil aeration apparatus 10 so long as spring capacity of the relief spring system 44 is equal to or greater than the weight of the soil aeration apparatus 10. The relief spring system 44 can absorb some of the applied force and the soil aeration apparatus 10 can be lifted by that force to effectively absorb the rest of that force.

In some embodiments, the soil aeration apparatus 10 can weigh about 180 pounds or less and the spring capacity of the relief spring system 44 can be about 250 pounds or more. In some embodiments, the soil aeration apparatus 10 can weigh between about 150 pounds and about 250 pounds. In some embodiments, the soil aeration apparatus 10 can weigh between about 100 pounds and about 500 pounds. In some embodiments, the spring capacity of the relief spring system 44 can be between about 200 pounds and about 300 pounds. In some embodiments, the spring capacity of the relief spring system 44 can be between about 150 pounds and about 600 pounds. In other embodiments, weight of the soil aeration apparatus 10 and spring capacity of the relief spring system 44 can have different values suitable for the application.

Figure 4:
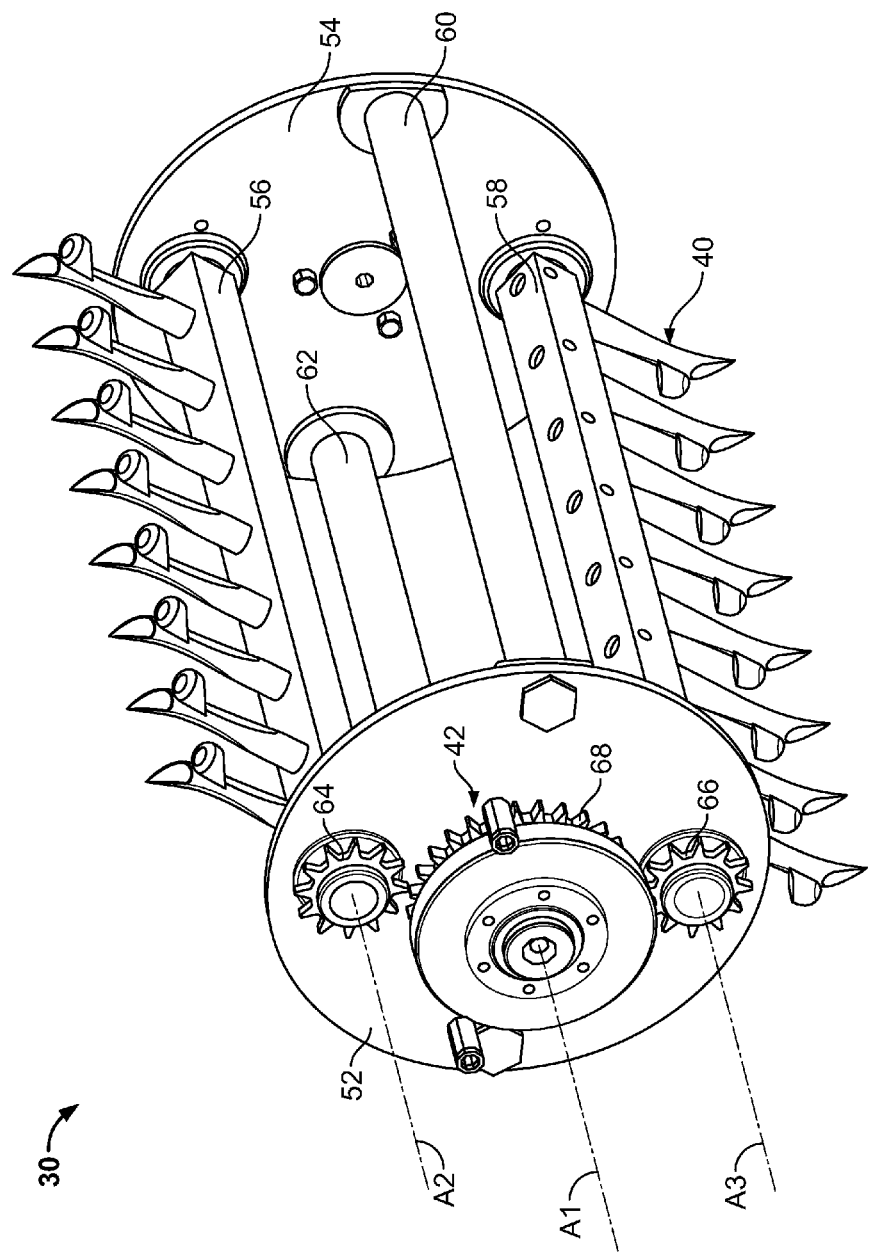
FIG. 4 is a perspective view of an aeration rotor of the soil aeration apparatus of FIG. 1.

Referring to FIG. 4, the aeration rotor 30 includes two opposing carriers 52 and 54 and includes two tine-holder shafts 56 and 58 extending between the carriers 52 and 54. The tine-holder shafts 56 and 58 are rotatably mounted to the carriers 52 and 54 such that each shaft can rotate about its own axis. The carriers 52 and 54 can be rotatable with respect to the frame 12 (shown in FIGS. 1 and 2) about a first axis A1, the tine-holder shaft 56 can be rotatable with respect to the carriers 52 and 54 about a second axis A2, and the tine-holder shaft 58 can be rotatable with respect to the carriers 52 and 54 about a third axis A3.

The tine-holder shafts 56 and 58 are positioned substantially parallel in an axial direction, and the aeration tines 40 extend from each tine-holder shaft 56 and 58 in a radial direction. The aeration tines 40 can penetrate and remove a portion of soil from a ground surface. Two non-centrally located shafts 60 and 62 also extend between the opposing carriers 52 and 54. The shafts 60 and 62 can be fixedly mounted to the carriers 52 and 54 and provide mechanical support for the soil aeration apparatus 10 when in operation.

The gear system 42 is engaged with the tine-holder shafts 56 and 58 to cause rotation of the tine-holder shafts 56 and 58. The gear system 42 has a plurality of planetary gears 64 and 66 for each sun gear 68. Each of the tine-holder shafts 56 and 58 has a planetary gear 64 or 66 attached thereto. In some embodiments, the sun gear 68 can be positioned between the planetary gears 64 and 66 and engaged with the planetary gears 64 and 66 using a drive chain (not shown). Because two planetary gears 64 and 66 are operated using an individual sun gear 68, the bulkiness of the gear system 42 can be reduced. The aeration rotor 30 need not use a centrally located support shaft and the tine-holder shafts 56 and 58 can be positioned closer to one another, thus reducing overall size of the soil aeration apparatus 10. Rotation of the tine-holder shafts 56 and 58 can turn the aeration tines 40 to sweep through a central portion of the aeration rotor 30, overlapping the aeration tines 40 on the tine-holder shaft 56 with the aeration tines 40 on the tine-holder shaft 58 such that the aeration tines 40 on both of the tine-holder shafts 56 and 58 sweep through the first axis A1.

In some embodiments, the aeration rotor 30 can have a radius extending from the first axis A1 to each of the second and third axes A2 and A3 of about 3.5 inches. In some embodiments, the aeration rotor 30 can have a radius extending from the first axis A1 to each of the second and third axes A2 and A3 of between about 3 inches to about 4 inches. In some embodiments, the aeration rotor 30 can have a radius extending from the first axis A1 to each of the second and third axes A2 and A3 of between about 2 inches to about 6 inches. Some or all of the aeration tines 40 can exceed the radius of the aeration rotor 30.

The planetary gear 64 can be axially aligned with the tine-holder shaft 56 and fixedly mounted to a portion of the tine-holder shaft 56 extending through the carrier 52. Similarly, the planetary gear 66 can be axially aligned with the tine-holder shaft 58 and mounted to a portion of the tine-holder shaft 58 extending through the carrier 52. In some embodiments, the planetary gears 64 and 66 can be aligned with the sun gear 68 such that a single drive chain can be engaged with all three gears 64, 66, and 68. The sun gear 68 can be axially aligned with the first axis A1 of the carriers 52 and 54 and remain substantially fixed as the carriers 52 and 54 rotate. When the carriers 52 and 54 rotate, the tine-holder shafts 56 and 58 can be driven to revolve around the first axis A1. Likewise, the planetary gears 64 and 66 can also revolve around the first axis A1. As such, the planetary gears 64 and 66 revolve about the sun gear 68 as the drive chain causes the planetary gears 64 and 66 to rotate. The motion of revolving the tine-holder shafts 56 and 58 about the first axis A1 while rotating the tine-holder shafts 56 and 58 about the second and third axes A2 and A3 can cause motion of the tines 40 to penetrate and remove soil plugs from the ground surface 22 (shown in FIG. 1). Gear ratio of the sun gear 68 to the planetary gears 64 and 66 can be 2:1 such that the tine-holder shafts 56 and 58 go through two revolutions for every revolution of the aeration rotor 30.

The shafts 60 and 62 can be positioned between the carriers 52 and 54 and mounted near a perimeter of each carrier 52 and 54. Because the shafts 60 and 62 are non-centrally located (e.g., offset from the first axis A1), the tine-holder shafts 56 and 58 may be positioned closer to the first axis A1 without interference from the tines 40 hitting a centrally located shaft that may be present in other designs. Rather, the tine-holder shafts 56 and 58 may rotate as the tines 40 pass through the first axis A1 without interference. A compact arrangement of shafts 56, 58, 60, and 62 can reduce overall size of the soil aeration apparatus 10 in comparison to other apparatuses.

Figure 5A:
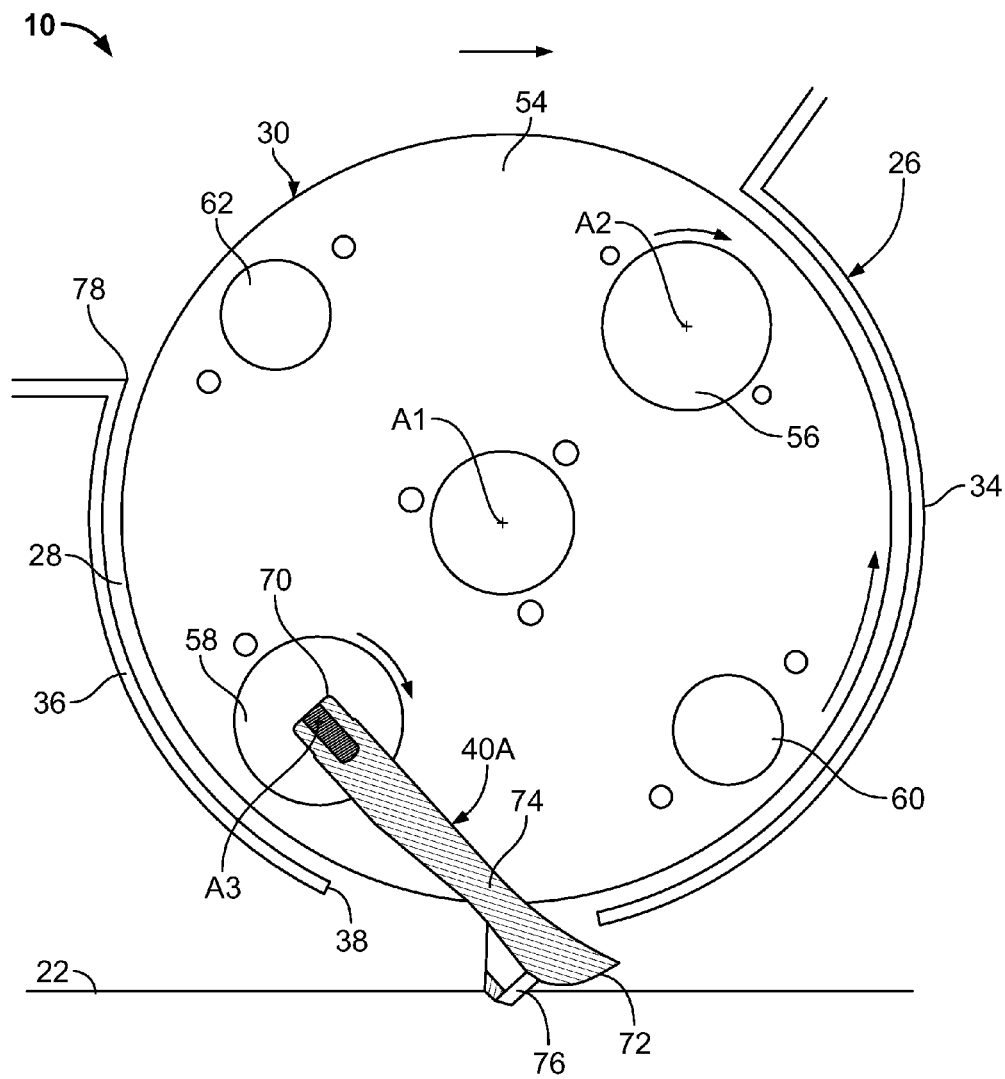
FIGS. 5A-5C are schematic side sectional views of the aeration rotor at different angles of rotation.
Figure 5B:
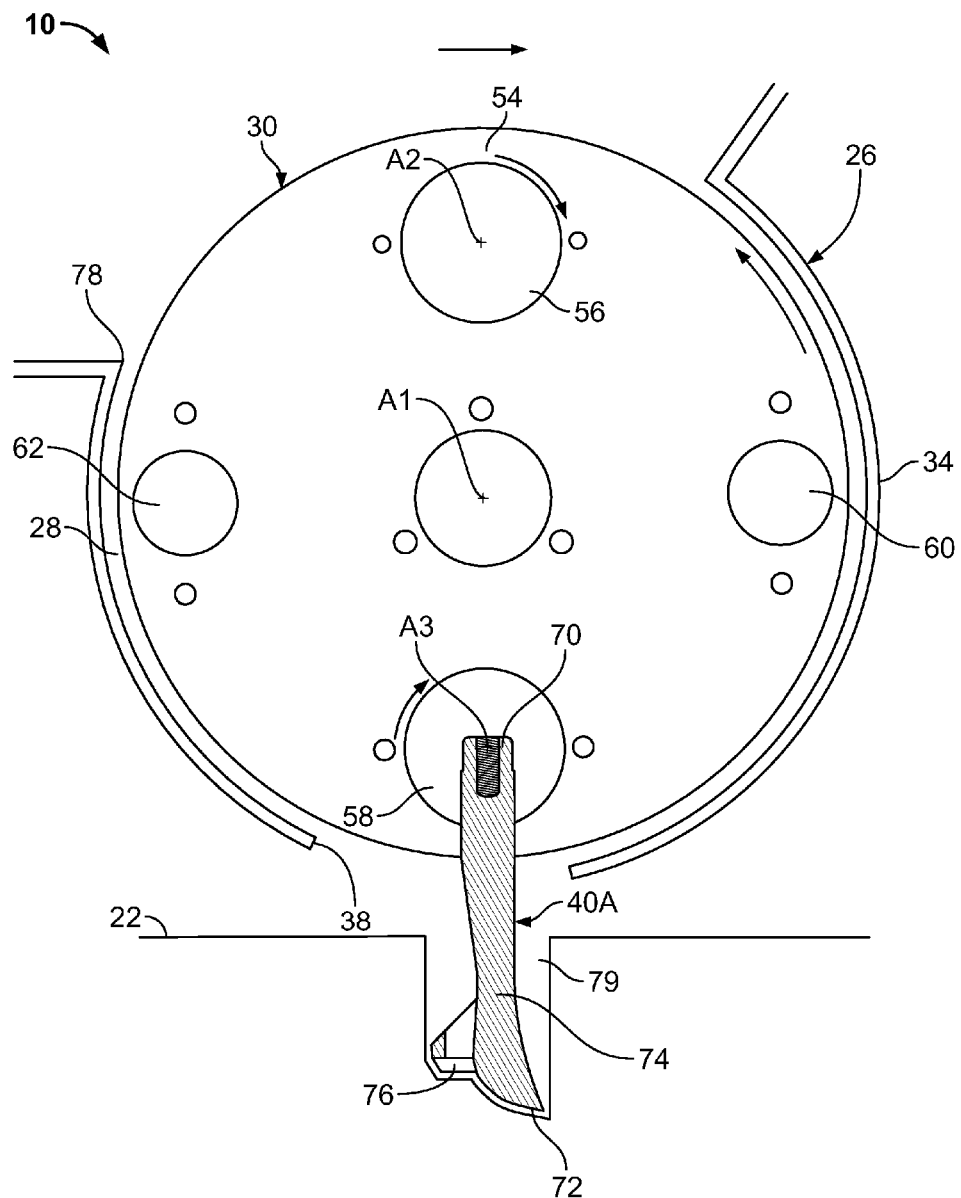
Figure 5C:
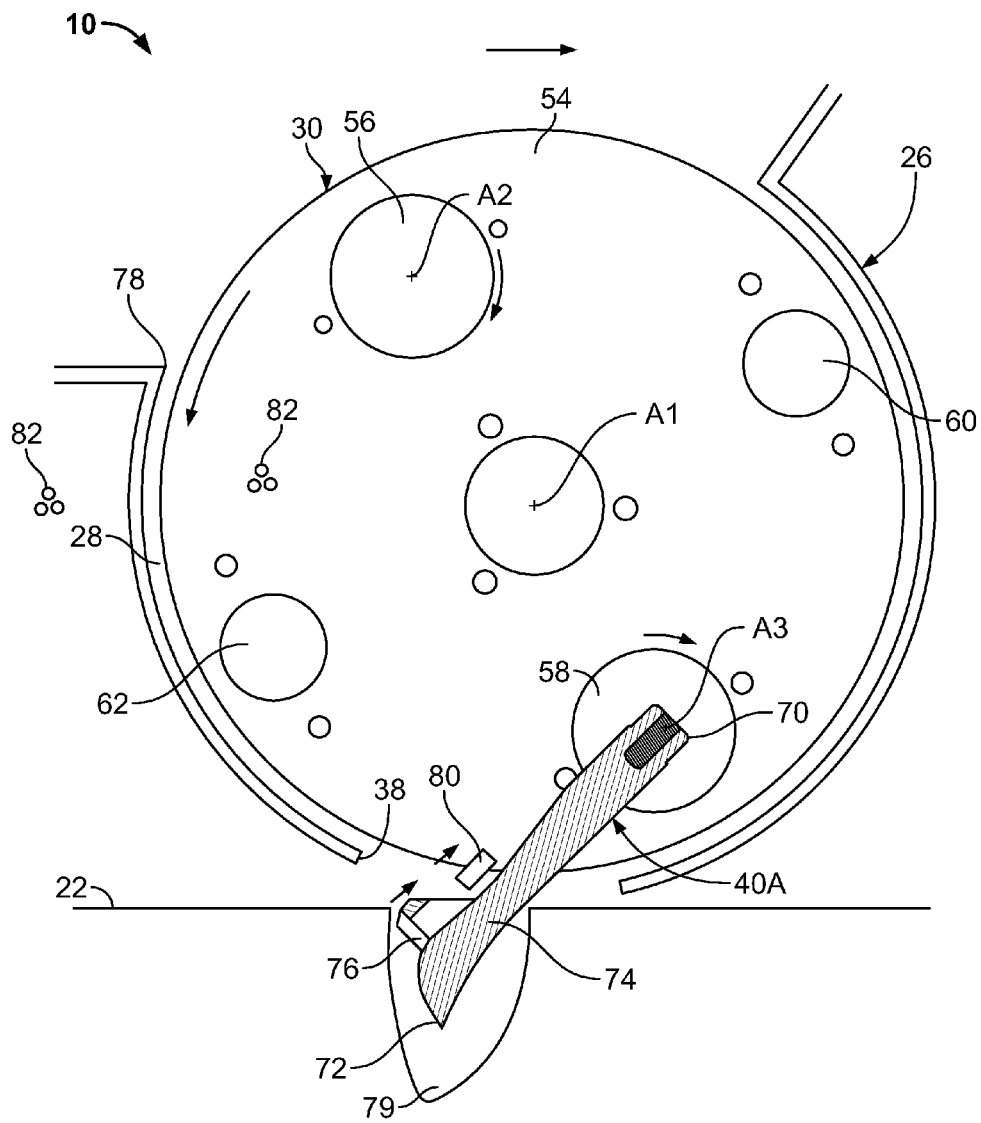
Figure 6:
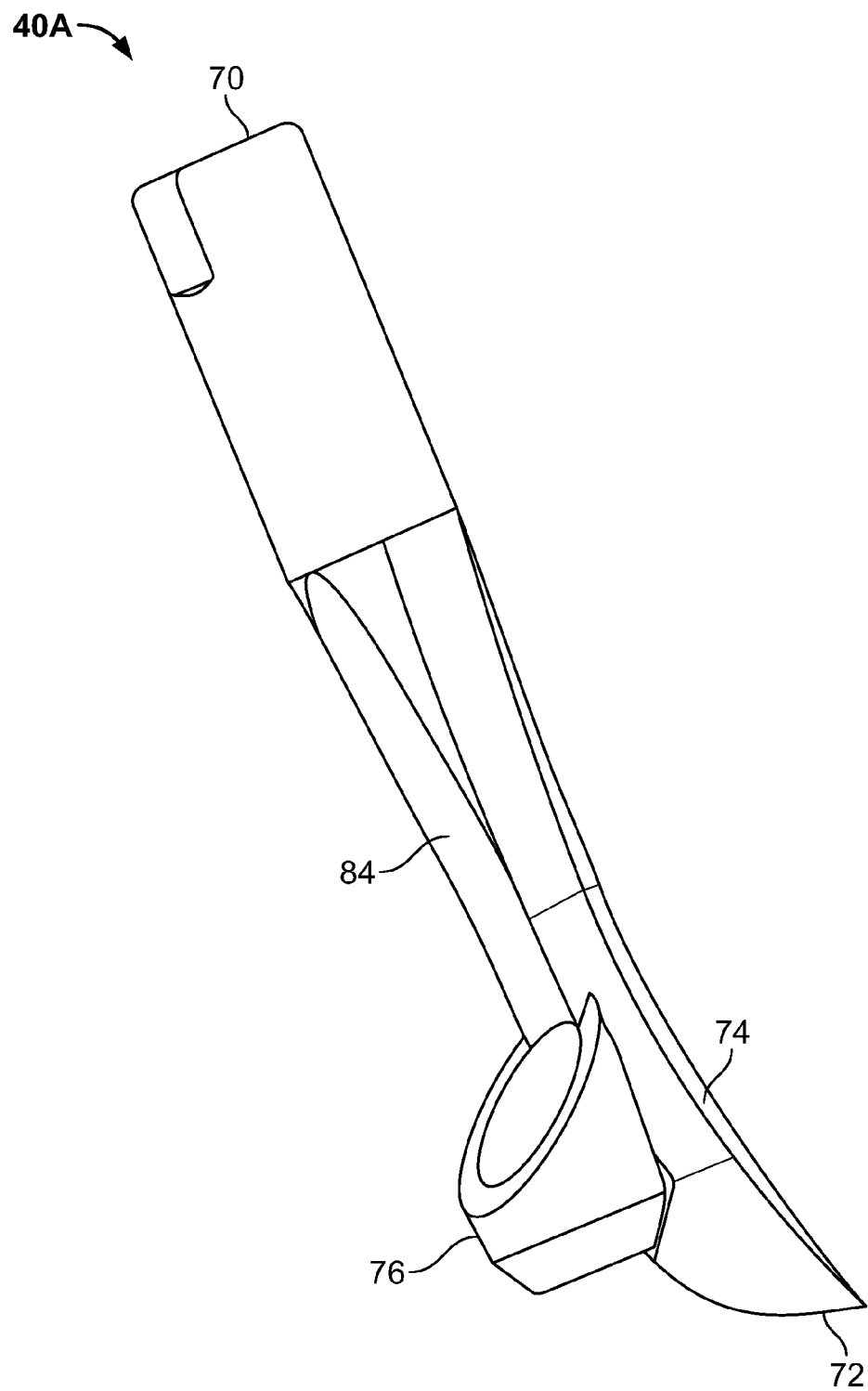
FIG. 6 is a perspective view of an aeration tine for use in the soil aeration apparatus of FIG. 1.

FIGS. 5A-5C are schematic side sectional views of the aeration rotor 30 at different angles of rotation. The aeration tine 40A is one of the aeration tines 40 (shown in FIGS. 2-4) attached to the tine-holder shaft 58. The aeration tine 40A has a proximal connecting end 70 that is connected to the tine-holder shaft 58 and a distal end 72 extending away from the tine-holder shaft 58. The aeration tine 40A has a knife 74 extending from the connecting end 70 to the distal end 72 and has a tube 76 attached to a rear edge of the knife 74. The knife 74 can be configured for cutting a hole in the ground surface 22 and the tube can be configured for pulling a soil plug from the ground surface 22. FIGS. 5A-5C are shown with those aeration tines 40 that can be attached to the tine-holder shaft 56 omitted. In some embodiments, aeration tines 40 can be removed and replaced from the tine-holder shafts 56 and 58 when worn or damaged.

The shield 26 includes the front shield 34 and the rear shield 36 with the aeration rotor 30 positioned there-between. The shield 26 defines the bottom tine port 38 substantially below the aeration rotor 30 and a top tine port 78 substantially above the aeration rotor 30. In some embodiments, the bottom tine port 38 and the top tine port 78 can each be positioned slightly off-center with respect to the axis A1. The bottom and top tine ports 38 and 78 are each defined between the front shield 34 and the rear shield 36. In other embodiments, the shield 26 can be formed of a single component (or multiple components) with one or more tine ports at each of the top and bottom of the shield 26. In some embodiments the bottom and top tine ports 38 and 78 can extend substantially an entire length of the aeration rotor 30. In other embodiments, the bottom and top tine ports 38 and 78 can extend only a portion of the length of the aeration rotor 30.

Referring to FIGS. 5A-5C, during operation, the soil aeration apparatus 10 can moved in a forward direction (e.g., from left to right with respect to the view shown in FIGS. 5A-5C) while the aeration rotor 30 provides the planetary motion for the aeration tines. In particular, the aeration rotor 30 can rotate in a counter-clockwise direction (with respect to the view shown in FIGS. 5A-5C), and the tine-holder shafts 56 and 58 as well as the aeration tines 40 can rotate in a clockwise direction (with respect to the view shown in FIGS. 5A-5C). The aeration tines 40 can exit and re-enter the rotor cavity 28 at each of the bottom and top tine ports 38 and 78 during a full rotation of the aeration rotor 30. With a gear ratio of 2:1, the tine-holder shafts 56 and 58 go through two revolutions for every revolution of the aeration rotor 30 and thus exit the rotor cavity only twice: once at the bottom tine port 38 and once at the top tine port 78. In some embodiments, the aeration rotor 30 can operate to assist in propelling the soil aeration apparatus 10 forward as the aeration rotor 30 drives the aeration tines 40 into the ground surface 22.

As shown in FIG. 5A, the distal end 72 of the aeration tine 40A has just exited through the bottom tine port 38 and is beginning to penetrate the ground surface 22. The aeration rotor 30 can continue rotating so as to cause the aeration tine 40A to further penetrate the ground surface 22.

FIG. 5B shows the aeration tine 40A extending into a hole 79, which can be an aeration pocket formed in the ground surface 22 by the aeration tine 40A. The aeration tine 40A is shown in a substantially vertical orientation. The aeration tine 40A can have a shape and path of movement configured for cutting the hole 79 with a vertical or substantially vertical forward edge. The aeration rotor can continue rotation so as to cause the aeration tine 40A to exit the ground surface 22.

FIG. 5C shows the aeration tine 40A exiting the hole 79 in the ground surface 22. As shown in FIG. 5C, the aeration tine 40A has pulled a soil plug 80 from the hole 79. The aeration tine 40A can have a shape and path of movement configured for cutting a relatively narrow hole 79 from its forward edge to its rear edge. In some embodiments, the hole 79 can be sized and shaped differently than as illustrated.

Motion of the aeration tine 40A can cause the aeration tine 40A to throw or fling the soil plug 80 out of the tube 76 and into the rotor cavity 28. In some embodiments, the aeration rotor 30 can be configured and operated such that the soil plug 80 can be thrown into one of the shafts 60 and 62, which can act as pulverizing bars to pulverize the soil plug 80 into soil particles 82. The soil plug 80 can be pulverized by the shafts 60 and 62, the tine-holder shafts 56 and 58, and the aeration tines 40 as the aeration rotor 30 rotates. The soil plug 80 can be pulverized by components of the aeration rotor 30 until the soil plug 80 has broken into soil particles small enough to pass through the sifting ports 32 (shown in FIG. 1) out of the rotor cavity 28. This can allow soil pulled as a soil plug 80 to be returned to the ground surface 22 as soil particles 82. This can reduce or eliminate the number of soil plugs 80 left on the ground surface 22, which can be considered unsightly to some users.

In some embodiments, the shafts 60 and 62 can be positioned near inner surfaces of the shield 26 so as to grind the soil plug 80 against the shield 26. In some embodiments, the shafts 60 and 62 can be positioned about 0.1 inch from the inner surface of the shield 26. In some embodiments, the shafts 60 and 62 can be positioned between about 0.05 inch and about 0.2 inch from the inner surface of the shield 26.

In some embodiments, the shafts 60 and 62 can be shaped and configured differently than as illustrated. For example, in some embodiments, the shafts 60 and 62 can have a square or rectangular cross-section. In some embodiments, the shafts 60 and 62 can include one or more brushes (not shown) configured to brush the soil plug 80 against the shield 26. In some embodiments, the shafts 60 and 62 can include one or more scoops (not shown) or other projections configured to strike and pulverize the soil plug 80 during operation. Brushes and/or other projections on the shafts 60 and 62 can also function to dethatch the aeration tines 40 during operation.

Figure 7:
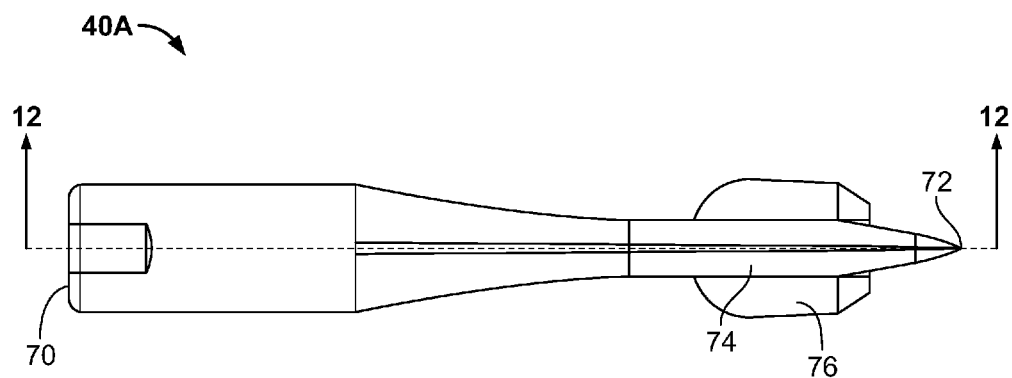
FIG. 7 is a top view of the aeration tine of FIG. 6.
Figure 8:
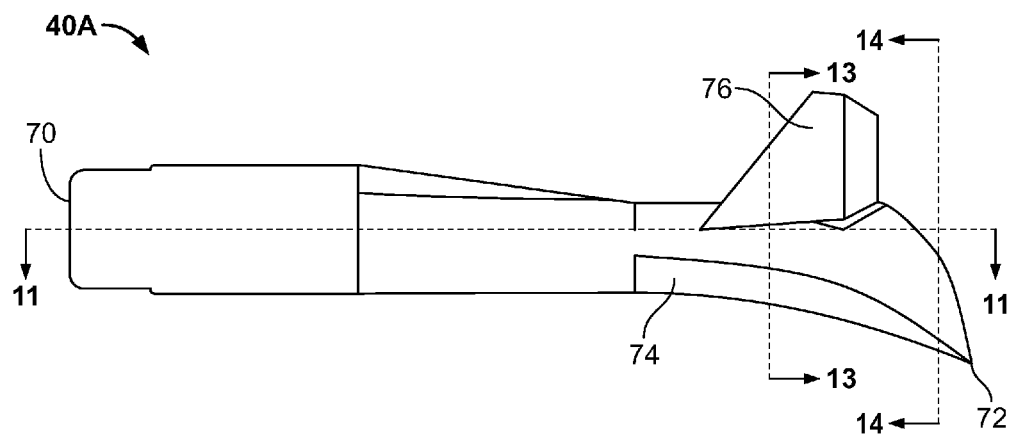
FIG. 8 is a side view of the aeration tine of FIG. 6.
Figure 9:
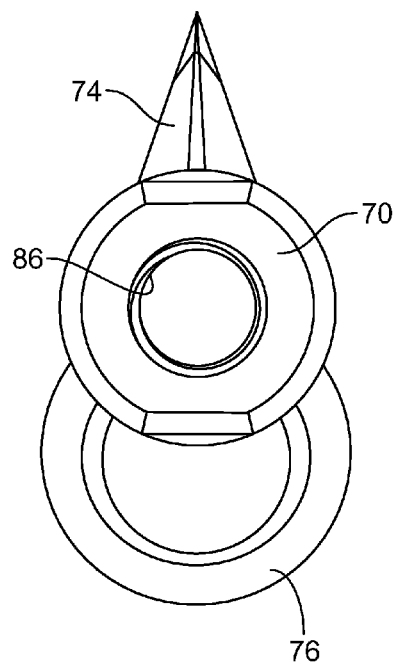
FIG. 9 is an end view of a connecting end of the aeration tine of FIG. 6.
Figure 10:
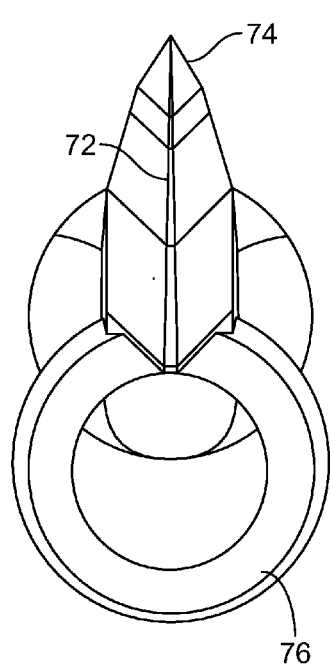
FIG. 10 is an end view of a distal end of the aeration tine of FIG. 6.

Referring now to FIGS. 6-10, in some embodiments, the knife 74 of the aeration tine 40A may include a concave rear surface 84 extending along a rear of the knife 74. The concave rear surface 84 can be aligned with the tube 76 (FIG. 6) so as to flip the soil plug 80 (shown in FIG. 5A) when the soil plug 80 is thrown from the tube 76. FIG. 7 is a top view of the aeration tine 40A. FIG. 8 is a side view of the aeration tine 40A. FIG. 9 is an end view of the connecting end 70 of the aeration tine 40A. FIG. 9 shows the aeration tine 40A having a threaded bore 86 at the connecting end 70 that can be configured for connecting to the tine-holder shafts 56 and 58. FIG. 10 is an end view of the distal end 72 of the aeration tine 40A.

Figure 11:
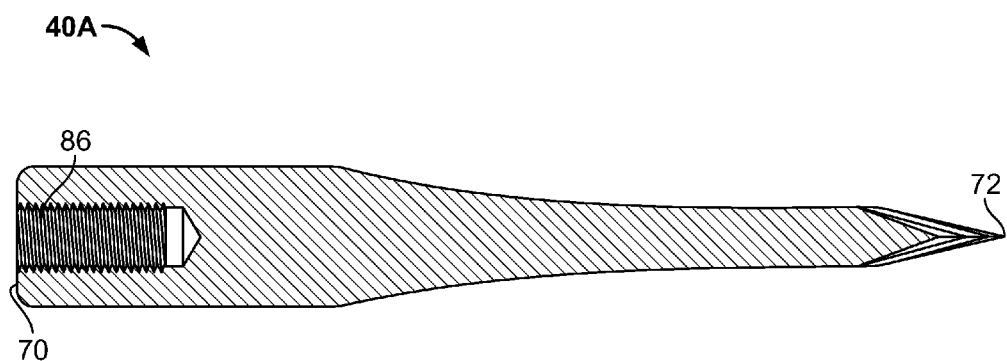
FIG. 11 is a sectional view of the aeration tine taken along line 11-11 of FIG. 8.
Figure 12:
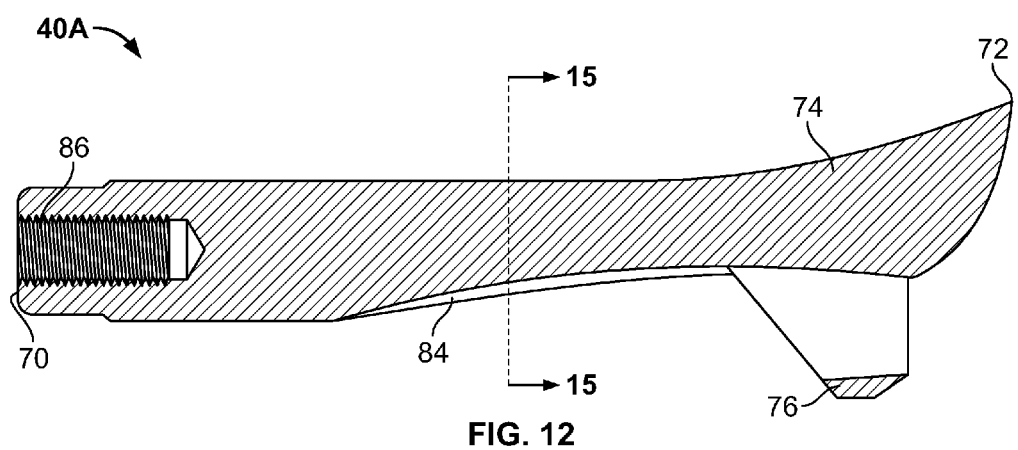
FIG. 12 is a sectional view of the aeration tine taken along line 12-12 of FIG. 7.
Figure 13:
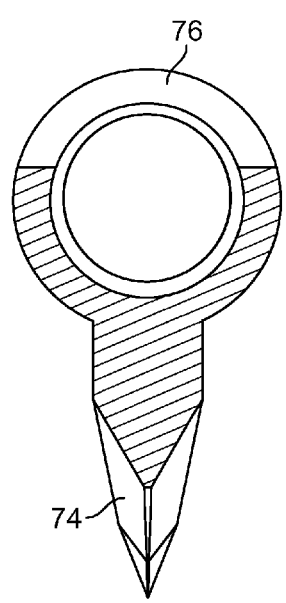
FIG. 13 is a sectional view of the aeration tine taken along line 13-13 of FIG. 8.
Figure 14:
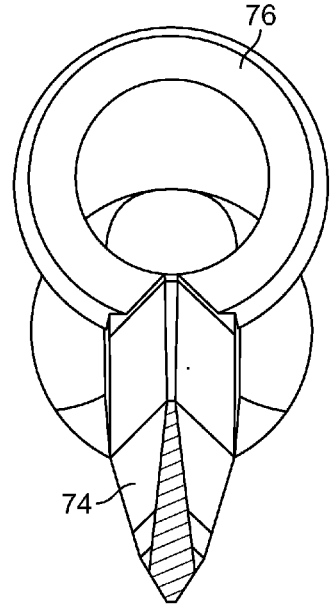
FIG. 14 is a sectional view of the aeration tine taken along line 14-14 of FIG. 8.
Figure 15:
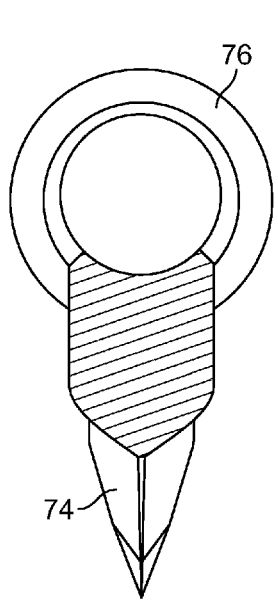
FIG. 15 is a sectional view of the aeration tine taken along line 15-15 of FIG. 12.

FIG. 11 is a sectional view of the aeration tine 40A taken along line 11-11 of FIG. 8. FIG. 12 is a sectional view of the aeration tine 40A taken along line 12-12 of FIG. 7. FIG. 13 is a sectional view of the aeration tine 40A taken along line 13-13 of FIG. 8. FIG. 14 is a sectional view of the aeration tine 40A taken along line 14-14 of FIG. 8. FIG. 15 is a sectional view of the aeration tine 40A taken along line 15-15 of FIG. 12. The aeration tine 40A has a shape suitable for cutting and pulling soil plugs 80 from the ground surface 22 in some embodiments of the soil aeration apparatus 10. In some embodiments, the aeration tine 40A can be modified as suitable for the application. In some embodiments, the aeration tine 40A can be replaced with an alternative aeration tine, such as an aeration tine having a knife similar to the knife 74 but without a tube similar to the tube 76.

Figure 16:
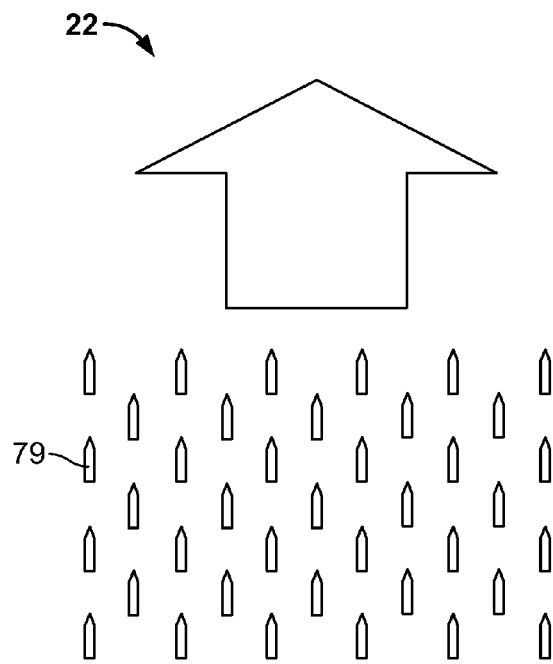
FIGS. 16-17 are top views of a ground surface having soil aerated in accordance with certain embodiments of the invention.
Figure 17:
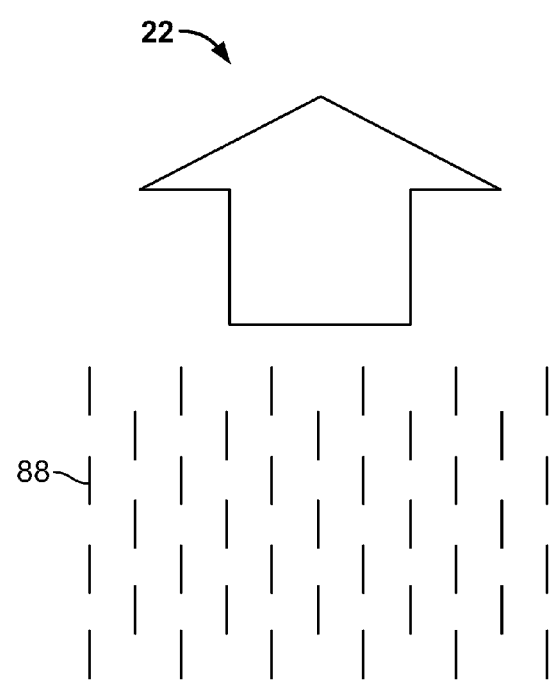

FIGS. 16-17 are top views of the ground surface 22 having soil aerated in accordance with particular embodiments of the soil aeration apparatus 10 (e.g., such as the embodiment depicted in FIGS. 1-3). FIG. 16 shows soil aerated using aeration tines 40 (shown in FIGS. 2-15). As the soil aeration apparatus 10 moves over the ground surface 22 in a forward direction, the aeration tines 40 can execute penetration, sweeping, and soil plug removal actions described above to form the holes 79. Each row of holes 79 can be staggered with respect to the neighboring rows due to the aeration tines 40 being in a staggered position relative to the aeration tines 40 on the neighboring tine-holder shaft 56 or 58. In FIG. 17, the ground surface 22 can be aerated using aeration blades (not shown) similar to the aeration tine 40A but with the tube 76 omitted. Such aeration blades can form holes 88 in the ground surface 22 to aerate the soil as the soil aeration apparatus moves in the forward direction. Holes 88 can be narrower than the holes 79 (shown in FIG. 16) due to not including a tube for removing a soil plug.

Staggering the position of the holes 79 and 88 (shown in FIGS. 16 and 17) can increase the perforation density (number of holes/slits in a given area) in the ground surface 22, thus greatly reducing soil compaction with a single pass of the soil aeration apparatus 10. If rotational velocity of the aeration rotor 30 is increased relative to land speed, the holes 79 and 88 can be located closer together. If desired, the holes 79 and 88 can overlap other holes 79 and 88 so as to form a continuous slit. Density of these staggered holes 79 and 88 (i.e. the number of pockets per unit area of turf) can be significantly greater than that obtained by conventional systems.

Various embodiments of the soil aeration apparatus described above can perform relatively efficient and high quality aeration of ground surface soil. Operation of an aeration rotor with one or more shields can allow a soil aeration apparatus to pull soil plugs and pulverize those soil plugs to soil particles to be returned to the ground surface. Including sifting ports in the shield can allow the shield to retain soil plugs in the rotor cavity and allow smaller soil particle to pass. Features and components of the aeration rotor can be configured for improved pulverizing of the soil plug. Various features and components of the soil aeration apparatus can also facilitate the soil aeration apparatus being simpler, smaller, and lighter weight. For example, certain features of the aeration rotor can allow the aeration rotor to be smaller and lighter-weight as compared to some rotor designs. Configuring the aeration rotor to include no central shaft, allows the aeration tines to rotate through a central axis of the aeration rotor and thus allows for a smaller radius of the aeration rotor. Use of light-weight materials, such as aluminum, for certain components (such as frame and housing) while using heavier and stronger materials for components experiencing greater load and wear (such as aeration rotor) can reduce overall weight of the soil aeration apparatus while maintaining durability. The aeration rotor can be configured with a simpler design that uses less power and that can help propel the soil aeration apparatus during operation. This can allow the soil aeration apparatus to have a smaller motor and a smaller, lighter overall structure. Configuring the soil aeration apparatus to be a push or walk-behind apparatus can allow for operation of a smaller soil aeration apparatus operable in smaller spaces and/or without a tow vehicle. Various features described above can help reduce overall cost and complexity as compared to some designs, making some embodiments of the soil aeration apparatus easier and more affordable to manufacture and operate.

A number of embodiments of the invention have been described. Nevertheless, it will be understood that various modifications may be made without departing from the spirit and scope of the invention. For example, the specific shape and orientation of various components such as the gear system, the housing, the wheels, and the aeration rotor can be modified from those illustrated in the figures so long as the soil aeration apparatus is suitable for a desired application. While the soil aeration apparatus is illustrated as a relatively small, walk-behind apparatus that can pulverize soil cores, other embodiments can include features described above for a towable soil aeration apparatus that pulverizes soil cores and still other embodiments can include features described above for a relatively small, walk-behind apparatus that cuts holes but does not pull cores. Thus, various embodiments of a soil aeration apparatus can include some but not all of the features described above. Accordingly, other embodiments are within the scope of the following claims.

What is claimed is:

1. A soil aeration apparatus comprising:
    an aeration rotor comprising a carrier and a plurality of aeration tines supported by the carrier, wherein the rotor is configured to drive the aeration tines to penetrate soil and remove soil plugs from the soil when the aeration rotor is rotated; and
        a shield defining a rotor cavity and at least partially surrounding the aeration rotor positioned in the rotor cavity, wherein the shield defines at least one tine port sized and positioned to allow for ingress and egress of the aeration tines during rotation of the rotor, and wherein the shield defines a plurality of sifting ports sized small enough to contain soil plugs within the rotor cavity and large enough to allow soil particles from broken soil plugs to pass through the sifting ports out of the rotor cavity, wherein the shield defines a second tine port sized and positioned to allow for ingress and egress of the aeration tines during rotation of the rotor, wherein the aeration tines extend out of the shield only at the first and second tine ports during rotation of the rotor.

2. The soil aeration apparatus of claim 1, wherein the aeration rotor comprises:
    first and second carriers rotatable about a first axis;
    a first tine-holder shaft extending between the first and second carriers, the first tine-holder shaft supporting a first set of aeration tines, wherein the first tine-holder shaft is rotatable with respect to the first carrier about a second axis; and
    a second tine-holder shaft extending between the first and second carriers, the second tine-holder shaft supporting a second set of aeration tines, wherein the second tine-holder shaft is rotatable with respect to the first carrier about a third axis.

3. The soil aeration apparatus of claim 2, wherein rotation of the first and second tine-holder shafts turns the first and second sets of aeration tines to sweep through the first axis.

4. The soil aeration apparatus of claim 2, wherein the aeration rotor rotates in a first direction and the first and second tine-holder shafts rotate in a second direction during rotation of the aeration rotor in the first direction.

5. The soil aeration apparatus of claim 2, wherein the aeration rotor has a radius extending from the first axis to each of the second and third axes of about 3.5 inches.

6. The soil aeration apparatus of claim 2, wherein the aeration rotor has a radius extending from the first axis to each of the second and third axes of between about 3 inches to about 4 inches.

7. The soil aeration apparatus of claim 2, wherein the aeration rotor has a radius extending from the first axis to each of the second and third axes of between about 2 inches to about 6 inches.

8. The soil aeration apparatus of claim 7, wherein at least some of the plurality of aeration tines have a length exceeding the radius.

9. The soil aeration apparatus of claim 1, wherein the aeration rotor comprises a pulverizing bar configured for pulverizing soil plugs into soil particles in the rotor cavity.

10. The soil aeration apparatus of claim 9, wherein the pulverizing bar is positioned between about 0.05 inch and about 0.2 inch from an inner surface of the shield.

11. The soil aeration apparatus of claim 1, wherein each of the aeration tines comprises a knife and a tube connected to the knife, wherein the aeration rotor and aeration tines are configured to pull soil plugs from a ground surface and fling the soil plugs into the rotor cavity to be pulverized into soil particles by the aeration rotor within the rotor cavity.

12. The soil aeration apparatus of claim 1, and further comprising:
    a motor operably connected to the aeration rotor to drive rotation of the aeration rotor; and
    a relief spring system connected between the motor and the aeration rotor and configured to allow for some rotation by the motor when rotation of the aeration tines is temporarily slowed or stopped.

13. The soil aeration apparatus of claim 12, wherein spring capacity of the relief spring system is equal to or greater than weight of the soil aeration apparatus.

14. The soil aeration apparatus of claim 13, wherein the spring capacity of the relief spring system is between about 150 pounds and about 600 pounds and the soil aeration apparatus weighs between about 100 pounds and about 500 pounds.

15. A soil aeration apparatus comprising:
    an aeration rotor comprising a carrier and a plurality of aeration tines supported by the carrier, wherein the rotor is configured to drive the aeration tines to penetrate soil and remove soil plugs from the soil when the aeration rotor is rotated; and
        a shield defining a rotor cavity and at least partially surrounding the aeration rotor positioned in the rotor cavity, wherein the shield defines at least one tine port sized and positioned to allow for ingress and egress of the aeration tines during rotation of the rotor, and wherein the shield defines a plurality of sifting ports sized small enough to contain soil plugs within the rotor cavity and large enough to allow soil particles from broken soil plugs to pass through the sifting ports out of the rotor cavity, wherein the shield comprises a front shield positioned forward of the aeration rotor and a rear shield positioned behind the aeration rotor, wherein each of the front and rear shields define a plurality of the sifting ports sized small enough to contain soil plugs within the rotor cavity and large enough to allow soil particles from broken soil plugs to pass through the sifting ports out of the rotor cavity.

16. The soil aeration apparatus of claim 15, and further comprising:
a frame connected to at least two wheels for travelling over a ground surface, the frame supporting the rotor and having a handle positioned and configured to facilitate a user to push the soil aeration apparatus.

17. The soil aeration apparatus of claim 16, and further comprising:
a motor supported by the frame and operably connected to the aeration rotor to drive rotation of the aeration rotor such that the aeration tines can penetrate and exit the ground when the aeration rotor is rotated.

18. The soil aeration apparatus of claim 17, and further comprising:
a relief spring system connected between the motor and the aeration rotor and configured to allow for some rotation by the motor when rotation of the aeration tines is temporarily slowed or stopped.

19. The soil aeration apparatus of claim 18, wherein spring capacity of the relief spring system is equal to or greater than weight of the soil aeration apparatus.

20. A method of operating the soil aeration apparatus of claim 15, the method comprising:
moving a set of the plurality of aeration tines in a planetary motion such that the set of aeration tines revolve about a first axis and rotate about a second axis different than the first axis;
removing soil plugs from a ground surface via the aeration tines;
breaking the soil plugs into soil particles via components of the soil aeration apparatus; and
returning the soil particles to the ground surface.

21. The method of claim 20, the method further comprising:
flinging the soil plugs from the aeration tines into the rotor cavity, wherein the soil plugs are broken into soil particles in the rotor cavity.

22. The method of claim 20, the method further comprising:
passing the soil particles through the sifting ports.

23. The method of claim 20, the method further comprising:
walking behind the soil aeration apparatus and holding a handle of the soil aeration apparatus while operating the soil aeration apparatus to remove and break soil plugs.

24. The soil aeration apparatus of claim 15, wherein the aeration rotor comprises:
first and second carriers rotatable about a first axis;
a first tine-holder shaft extending between the first and second carriers, the first tine-holder shaft supporting a first set of aeration tines, wherein the first tine-holder shaft is rotatable with respect to the first carrier about a second axis; and
a second tine-holder shaft extending between the first and second carriers, the second tine-holder shaft supporting a second set of aeration tines, wherein the second tine-holder shaft is rotatable with respect to the first carrier about a third axis.

25. The soil aeration apparatus of claim 24, wherein the aeration rotor has a radius extending from the first axis to each of the second and third axes of about 3.5 inches.

26. The soil aeration apparatus of claim 24, wherein the aeration rotor has a radius extending from the first axis to each of the second and third axes of between about 2 inches to about 6 inches.

27. The soil aeration apparatus of claim 15, wherein the shield defines a second tine port sized and positioned to allow for ingress and egress of the aeration tines during rotation of the rotor, wherein the aeration tines extend out of the shield only at the first and second tine ports during rotation of the rotor.

28. The soil aeration apparatus of claim 15, wherein the aeration rotor comprises a pulverizing bar configured for pulverizing soil plugs into soil particles in the rotor cavity and wherein the pulverizing bar is positioned between about 0.05 inch and about 0.2 inch from an inner surface of the shield.

* * * * *